US009988565B2

(12) United States Patent
Pernecker et al.

(10) Patent No.: US 9,988,565 B2
(45) Date of Patent: Jun. 5, 2018

(54) ROSIN ESTER TACKIFIERS FOR PRESSURE-SENSITIVE ADHESIVES

(71) Applicant: ARIZONA CHEMICAL COMPANY, LLC, Jacksonville, FL (US)

(72) Inventors: Tibor Pernecker, Pooler, GA (US); Christopher J Holmes, Pooler, GA (US); Leigh E Quinlan, Pooler, GA (US)

(73) Assignee: Arizona Chemical Company, LLC, Jacksonville, FL (US)

( * ) Notice: Subject to any disclaimer, the term of this patent is extended or adjusted under 35 U.S.C. 154(b) by 0 days. days.

(21) Appl. No.: 14/781,140

(22) PCT Filed: Jun. 14, 2014

(86) PCT No.: PCT/US2014/000146
§ 371 (c)(1),
(2) Date: Sep. 29, 2015

(87) PCT Pub. No.: WO2014/200567
PCT Pub. Date: Dec. 18, 2014

(65) Prior Publication Data
US 2016/0122607 A1    May 5, 2016

Related U.S. Application Data

(60) Provisional application No. 61/835,373, filed on Jun. 14, 2013.

(51) Int. Cl.
| | |
|---|---|
| *C09J 193/04* | (2006.01) |
| *C09D 11/00* | (2014.01) |
| *C09J 7/04* | (2006.01) |
| *C09J 107/00* | (2006.01) |
| *C09J 133/08* | (2006.01) |
| *G09F 3/10* | (2006.01) |
| *C08L 93/04* | (2006.01) |

(52) U.S. Cl.
CPC ............. *C09J 193/04* (2013.01); *C08L 93/04* (2013.01); *C09D 11/00* (2013.01); *C09J 7/045* (2013.01); *C09J 107/00* (2013.01); *C09J 133/08* (2013.01); *G09F 3/10* (2013.01); *C09J 2203/334* (2013.01); *C09J 2400/283* (2013.01); *C09J 2407/00* (2013.01); *C09J 2433/00* (2013.01); *C09J 2453/00* (2013.01); *C09J 2493/00* (2013.01)

(58) Field of Classification Search
CPC ..................................................... C09J 193/04
See application file for complete search history.

(56) References Cited

U.S. PATENT DOCUMENTS

| | | | |
|---|---|---|---|
| 1,696,337 A | 12/1928 | Symmes | |
| 4,201,701 A | 5/1980 | Coney | |
| 4,260,550 A | 4/1981 | Armstrong et al. | |
| 4,477,613 A | 10/1984 | Evans et al. | |
| 4,643,848 A | 2/1987 | Thomas et al. | |
| 4,751,025 A | 6/1988 | Olechowski et al. | |
| 4,758,379 A | 7/1988 | Johnson, Jr. | |
| 5,504,129 A | 4/1996 | Dandreaux et al. | |
| 5,504,152 A | 4/1996 | Schluenz et al. | |
| 5,552,519 A * | 9/1996 | Hemmings ......... B01F 17/0028 156/327 |
| 5,559,206 A | 9/1996 | Williams | |
| 5,691,405 A | 11/1997 | Huffer | |
| 5,830,992 A | 11/1998 | Whalen | |
| 5,969,092 A | 10/1999 | Karvo | |
| 6,034,168 A | 3/2000 | Wang | |
| 6,171,385 B1 | 1/2001 | Rurlaender et al. | |
| 6,274,657 B1 | 8/2001 | Geoghegan et al. | |
| 6,444,022 B1 | 9/2002 | Krishnan et al. | |
| 6,900,274 B2 | 5/2005 | Ruckel et al. | |
| 7,452,941 B2 | 11/2008 | Ruckel et al. | |
| 7,994,106 B2 | 8/2011 | Nelson et al. | |
| 2003/0198773 A1 | 10/2003 | Miekka et al. | |
| 2004/0143065 A1 | 7/2004 | Holub et al. | |
| 2005/0203228 A1 | 9/2005 | Aarts et al. | |
| 2007/0135542 A1 | 6/2007 | Boonstra et al. | |
| 2008/0020957 A1* | 1/2008 | Nelson ................... C08L 93/04 508/449 |
| 2011/0034669 A1 | 2/2011 | Dallavia | |
| 2011/0213120 A1 | 9/2011 | Astrologes et al. | |

FOREIGN PATENT DOCUMENTS

| | | |
|---|---|---|
| CN | 101443426 A | 5/2009 |
| CN | 102039099 B | 6/2013 |
| EP | 1878429 A1 | 1/2008 |

OTHER PUBLICATIONS

International Search Report and Written Opinion dated Sep. 2, 2014 as issued in PCT/US2014-000146 filed Jun. 14, 2014.

* cited by examiner

*Primary Examiner* — Arrie L Reuther
(74) *Attorney, Agent, or Firm* — Samantha Page; Cantor Colburn LLP

(57) ABSTRACT

Water-dispersible adducted rosin esters, a process for making them, and their use in aqueous tackifier dispersions for pressure-sensitive adhesives are disclosed. Reaction of a rosin with a polyol gives a rosin ester intermediate, which is then reacted with a dienophile to produce an adducted rosin ester. The adducted rosin ester is further esterified with a polyethylene glycol having an Mw<700 to produce the water-dispersible adducted rosin ester. Esterification with the low-molecular-weight PEG imparts good water dispersibility to the adducted rosin ester while maintaining compatibility with other tackifier components. Combination of the aqueous tackifier dispersions with polymer emulsions, particularly acrylics, gives pressure-sensitive adhesives that deliver good loop tack and peel properties compared with commercial alternatives, even when the coat weight is reduced by 20%.

13 Claims, No Drawings

ROSIN ESTER TACKIFIERS FOR PRESSURE-SENSITIVE ADHESIVES

FIELD OF THE INVENTION

The invention relates to rosin ester tackifiers useful in the production of pressure-sensitive adhesives.

BACKGROUND OF THE INVENTION

Rosin esters, i.e., esters of rosin and polyols, have been known for almost a century (see, e.g., U.S. Pat. No. 1,696, 337) and are widely used as tackifiers for packaging and pressure-sensitive adhesives.

The simplest rosin esters are made by reacting a rosin acid, which may be disproportionated, with one or more polyols such as glycerol, pentaerythritol, and diethylene glycol. Improvements relate to ways to make rosin esters with low color or low odor. For examples, see U.S. Pat. Nos. 4,477,613; 4,758,379; 5,504,152; 5,830,992; and 5,969,092.

In another common approach, a rosin acid is first heated with an enophile such as an unsaturated dicarboxylic acid or anhydride (e.g., maleic anhydride or fumaric acid) to form an adduct by an ene reaction or a Diels-Alder reaction. Acid groups in the adduct are then esterified by reaction with a polyol (e.g., glycerol, pentaerythritol). For examples of rosin esters made this way, see U.S. Pat. Nos. 4,201,701; 4,643, 848; 5,559,206; 5,691,405; 6,171,385; and 7,994,106, and U.S. Pat. Appl. Publ. No. 2011/0213120.

Occasionally, a one-pot approach is used in which a rosin acid, polyol, and unsaturated diacid or anhydride are heated together. This usually involves principally esterification rather than formation of an adducted resin (see, e.g., U.S. Pat. No. 4,201,701).

In yet another approach, a rosin ester is made in the usual way be reacting a rosin acid and a polyol or mixture of polyols. In a second step, an adducted resin is then made by heating the rosin ester with an unsaturated diacid or anhydride. Usually, the acid groups are then modified to enhance water solubility or water dispersability. For examples, see U.S. Pat. Nos. 4,751,025 and 5,504,129.

Rosin esters have been used to make surfactants or emulsifiers. For instance, U.S. Pat. No. 4,260,550 teaches to form an adduct from rosin and maleic anhydride, followed by esterification with polyethylene glycol, 6000 mol. wt. (see Examples VIII-X). The PEG-modified rosin ester is used as a surfactant for making a hair care product. In another example, U.S. Pat. No. 6,274,657 teaches the preparation of a surfactant by reacting rosin or dimerized rosin with polyethylene glycol, 8000 mol. wt. The surfactant is combined with rosin ester tackifiers to make stable aqueous dispersions. In U.S. Pat. Nos. 6,900,274 and 7,452,941, a surfactant is made by reacting maleic anhydride with a terpene or hydrocarbon resin to form an adduct, which is further reacted with polyethylene glycol, 2000 mol. wt. This surfactant is also useful for making stable aqueous dispersions comprising rosin ester tackifiers. U.S. Pat. Appl. Publ. No. 2007/0135542 describes emulsifiers made by reacting a rosin with polyethylene glycol, followed by reaction with polyphosphoric acid. The resulting water-dispersible product is combined with tackifiers to give aqueous dispersions useful for pressure-sensitive adhesives.

In another variation on the surfactant theme, U.S. Pat. No. 5,552,519 teaches to prepare rosin ester surfactants in three steps. In one aspect, a rosin is first esterified with a polyol (e.g., glycerol) to an acid value of less than 30 mg KOH/g. The rosin ester is then grafted with an unsaturated dicarboxylic acid or anhydride. The grafted rosin ester is esterified with polyethylene glycol having a weight-average molecular weight (Mw) of 4000 to 16000. This material is used as a surfactant for creating an aqueous dispersion of a rosin ester based on rosin and pentaerythritol. The dispersion is combined with a tackifier and an acrylic polymer, and this mixture is used to make a pressure-sensitive adhesive.

Improved tackifiers are needed, particularly ones useful in pressure-sensitive adhesives prepared from aqueous dispersions. In particular, the industry needs tackifiers than can be combined with acrylic emulsions to give adhesives having good loop tack and peel properties. Preferably, the tackifiers could be made using conventional, economical starting materials, conventional equipment, and ordinary process steps. Ideally, the tackifiers could reduce reliance on surfactants and deliver desirable adhesive properties while reducing coat weight by 10-20% or more.

SUMMARY OF THE INVENTION

In one aspect, our invention relates to a water-dispersible, water insoluble adducted rosin ester and a process for making it. A rosin is reacted with a polyol to give a rosin ester intermediate, which is then reacted with a dienophile to produce an adducted rosin ester. The adducted rosin ester is further esterified with a polyethylene glycol to produce the water-dispersible water insoluble adducted rosin ester. The polyethylene glycol has a weight-average molecular weight less than 700.

The invention includes aqueous tackifier dispersions comprising water, a surfactant, and the adducted rosin ester. The aqueous tackifier dispersions are prepared by combining components under high-shear conditions. Also included are pressure-sensitive adhesives comprising a polymer emulsion and the inventive tackifier dispersions, as well as laminates used in label making. The laminates comprise a release liner, a layer of inventive adhesive coated on a surface of the release liner, and a face stock laminated to the adhesive-coated release liner.

Although adducted rosin esters are often difficult to disperse in water, we surprisingly found that esterification of adducted rosin esters with low-molecular-weight PEG imparts good water insolubility and dispersibility to the adducted rosin ester while maintaining compatibility with other tackifier components used in the production of aqueous dispersions. The aqueous tackifier dispersions can be combined with polymer resins, particularly acrylics, to give pressure-sensitive adhesives that deliver good loop tack and peel properties compared with commercial alternatives, even when the coat weight is reduced by 20%. Because equivalent performance can be achieved at lower coat weights, formulators can choose to reduce cost by using less adhesive or to enhance performance at traditional coat weights.

DETAILED DESCRIPTION OF THE INVENTION

The invention relates to water insoluble and water-dispersible adducted rosin esters and a process for making them. In a first step, a rosin is reacted with a polyol to give a rosin ester intermediate.

Rosins suitable for use have carboxylic acid functionality and multiple carbocyclic rings. Structurally, preferred rosins (also called "rosin acids") include mono-carboxylic acids with the general formula $C_{19}H_{29}COOH$, with a nucleus of three fused six-carbon rings and comprise double bonds that vary in number and location. Examples of rosin acids include abietic acid, neoabietic acid, dehydroabietic acid, pimaric acid, levopimaric acid, sandaracopimaric acid, isopimaric acid and palustric acid.

The rosin may be used in isolated form, or as part of a composition which may comprise a plurality of rosin acids. In particular, rosin may be used as a source of rosin acid. Rosin is a hydrocarbon secretion of many plants, particularly coniferous trees such as *Pinus palustris* and *Pinus caribaea*. Natural rosin typically consists of a mixture of seven or eight rosin acids, and other minor components. Rosin is commercially available and can be obtained from pine trees by distillation of oleoresin (gum rosin being the residue of distillation), by extraction of pine stumps (wood rosin) or by fractionation of tall oil (tall oil rosin). Any type of rosin may be used, including tall oil rosin, gum rosin and wood rosin. In one embodiment, tall oil rosin is used because of its availability. Examples of suitable commercially available rosins include tall oil rosins (e.g. Sylvaros® 85, Sylvaros® 90 or Sylvaros® 95 from Arizona Chemical). For further examples of suitable rosins, see U.S. Pat. No. 7,994,106 and U.S. Pat. Apple Publ. No. 2011/0034669, the teachings of which are incorporated herein by reference.

A polyol is reacted with the rosin. Suitable polyols have two or more hydroxyl groups available for forming esters with the carboxylic acid groups of the rosin. Preferred polyols have an average hydroxyl functionality within the range of 2 to 6. Preferred polyols are aliphatic and have 3 to 30 carbon atoms. In one embodiment, the polyols have a boiling point greater than 240° C. at atmospheric pressure. Suitable polyols include, for example, glycerin, pentaerythritol, trimethylolethane, trimethylolpropane, ethylene glycol, propylene glycol, diethylene glycol, triethylene glycol, tetraethylene glycol, 1,3-propanediol, 2-methyl-1,3-propanediol, 1,4-butanediol, 1,6-hexanediol, 1,4-cyclohexanedimethanol, diglycerol, dipentaerythritol, mannitol, sorbitol, hexitol, and the like, and mixtures thereof. Particularly preferred polyols include glycerin, pentaerythritol, trimethylolethane, trimethylolpropane, diethylene glycol, dipentaerythritol, sorbitol, and the like, and mixtures thereof. For further examples of suitable polyols, see U.S. Pat. Nos. 4,643,848 and 4,758,379, and U.S. Pat. Appl. Publ. No. 2011/0213120, the teachings of which are incorporated herein by reference.

The reaction of the polyol and rosin to make the rosin ester intermediate may be uncatalyzed or it may be performed in the presence of an acidic or basic catalyst. Suitable catalysts for the process include, for example, mineral acids (e.g., sulfuric acid, phosphoric acid), organic acids (e.g., p-toluenesulfonic acid, acetic acid), alkali metal and alkaline earth metal oxides, hydroxides, carbonates, acetates, and the like.

In one embodiment, the rosin ester intermediate has an acid value within the range of 40 to 60 mg KOH/g, or from 45 to 55 mg KOH/g. The rosin ester intermediate is normally not isolated but is used "as is" in the next reaction step. If the acid value of the rosin ester intermediate is too low or too high, the final resin may not disperse well enough in water or may not be hydrophobic enough to impart good tackification to the adhesive.

In some cases, the rosin ester intermediate may be available commercially. Thus, in one aspect of the invention, the rosin ester intermediate is simply purchased and used "as is" in the production of an adducted rosin ester as described below. Most often, however, commercial rosin esters will have an acid value of <20 mg KOH/g, which is too low for purposes of the present invention. In some cases, a commercial rosin ester might be modified by reaction with additional rosin or rosin and polyol to adjust the acid value to be within the preferred range of 40 to 60 mg KOH/g for the rosin ester intermediate. To summarize, use of a suitable commercial rosin ester having a high acid value or modification of a commercial rosin ester to give a rosin ester intermediate of satisfactory acid value is considered to be within the scope of the present invention.

In a second step, the rosin ester intermediate is reacted with a dienophile to produce an adducted rosin ester. "Adducted" means that the dienophile and rosin react and are joined by at least one carbon-carbon sigma bond. Usually, the principal bond-forming reaction is a Diels-Alder reaction, in which a six-membered monounsaturated ring is formed from the dienophile double bond and a pair of conjugated double bonds in the rosin.

Suitable dienophiles have a carbon-carbon double bond that is attached to at least one electron-withdrawing group (e.g., halogen, carbonyl group, oxygen, or the like) that makes the double bond electron deficient. The dienophile is capable of forming adducts with the unsaturation present in rosin. Suitable enophiles include $\alpha,\beta$-unsaturated acids, esters, and anhydrides such as maleic anhydride, maleic acid, maleate esters and half esters, fumaric acid, fumarate esters and half esters, itaconic acid, itaconic anhydride, itaconate esters and half esters, citraconic anhydride, acrylic acid, methacrylic acid, vinyl acetate, and the like, and mixtures thereof.

In one embodiment, the dienophile is selected from maleic anhydride, fumaric acid, itaconic acid, citraconic anhydride, acrylic acid, methacrylic acid, vinyl acetate, and mixtures thereof. In another embodiment, the dienophiles are maleic anhydride, fumaric acid, and itaconic acid. In a further embodiment, the dienophile is itaconic acid. For further examples of suitable dienophiles, see U.S. Pat. No. 4,751,025 and U.S. Pat. Appl. Publ. No. 2005/0203228, the teachings of which are incorporated herein by reference.

The adducted dienophile content of the water-dispersible adducted rosin ester is at least 3 wt. %, or at least 5 wt. %. In one more embodiment, adducted rosin esters having at least 5 wt. % of adducted maleic anhydride, fumaric acid, or itaconic acid, or at least 5 wt. %, or at least 6 wt. %, of adducted itaconic acid. In one aspect, the adducted rosin ester comprises from 6.0 to 8.0 wt. %, or from 6.0 to 7.5 wt. % of adducted itaconic acid.

The adducted rosin ester has an acid value within the range of 40 to 60 mg KOH/g, more or from 45 to 55 mg KOH/g. If the acid value of the adducted rosin ester is too low or too high, the final resin may not disperse well enough in water or may not be hydrophobic enough to impart good tackification to the adhesive.

The adducted rosin ester has a ring-and-ball softening point within the range of 60° C. to 77° C., more or from 65° C. to 72° C.

In a third step, the adducted rosin ester is further esterified with a polyethylene glycol having a weight-average molecular weight (Mw) less than 700. In one embodiment, the polyethylene glycol is then added, and the reaction mixture is heated at 100 to 300 degrees C. until the acid number is ~50 mg KOH/g, and the product has a Mettler softening point of ~70° C. In another embodiment, the polyethylene glycol has an Mw within the range of 200 to 400. In a further embodiment, the polyethylene glycol has a Mw of about 200. The Mw is determined by any desired method. Gel permeation chromatography is a convenient means of measuring Mw. Suitable polyethylene glycols having Mw values less than 700 are commercially available from Dow Chemical ("Carbowax™") products) and other suppliers. Suitable polyethylene glycols can also be synthesized from water or a diol a starter, a catalyst such as KOH or a double metal cyanide complex, and ethylene oxide according to well-known methods.

In another embodiment, the mass ratio of polyethylene glycol to ester is greater than 1:1, or from 1:1 to 1:20, or from 1:1 to 1:15.

We found that polyethylene glycols having Mw values above 700 are not suitable for use for making the inventive water-dispersible adducted rosin esters. In particular, when the Mw exceeds about 700, the adducted rosin ester becomes too hydrophilic (i.e., too soluble) and can no longer be dispersed in water. To function as a tackifier, the resin needs to be dispersible in water, so it must be reasonably hydrophobic. The water insoluble, water-dispersible adducted rosin esters made as described above may have one or more of the following properties:

Acid value: 40-55 mg KOH/g.
Ring-and-ball softening point (ASTM E28-99): 65-72° C.
Brookfield viscosity (at 100° C.): <15,000 cP.
Mw (by GPC): <2000, preferably <1500. Polydispersity (by GPC): <3.0.
Glass transition temperature, midpoint (by DSC): 10° C.-20° C.

In another embodiment, the tackifier of the present invention is insoluble in water, which allows the tackifier to be readily incorporated into the aqueous dispersion and provides an aqueous dispersion with lower viscosity, thus resulting in lower dry coat weight when placed upon the desired substrate while still maintaining the desired adhesion properties.

In one aspect, the invention relates to aqueous dispersions. The dispersions comprise water, a surfactant, and a tackifier. The tackifier comprises a water insoluble, water-dispersible adducted rosin ester as described above.

Preferred aqueous dispersions comprise 35 to 60 wt. % of water, 0.1 to 10 wt. % of the surfactant, and 40 to 65 wt. % of the tackifier; more preferably, the dispersions comprise 40 to 55 wt. % of water, 0.2 to 5 wt. % of the surfactant, and 45 to 60 wt. % of the tackifier.

The aqueous dispersions are preferably made by a process which comprises combining under high-shear conditions water, the surfactant, and the tackifier comprising the water insoluble, water-dispersible adducted rosin ester. The process for making the aqueous dispersion can be batch, semi-continuous, or continuous. Combining the water, surfactant, and tackifier under high-shear conditions enables the necessary phase inversion to give the water-dispersed tackifier.

Generally, enough water is present to allow the mixture of surfactant, water, and tackifier to undergo (upon combination under high-shear conditions) a phase inversion to form an oil-in-water dispersion (or emulsion). The amount of water needed to invert any particular combination of tackifier components and surfactants can be determined experimentally by progressively increasing the amount of water used. As the phase inversion point is approached for a water-in-oil dispersion, the viscosity of the mixture increases dramatically, then decreases rapidly as more water is introduced and inversion to an oil-in-water dispersion is completed. High-shear conditions are essential for making the traverse. The resulting oil-in-water dispersion has low viscosity and a continuous aqueous phase. Unlike the water-in-oil dispersion, the oil-in-water dispersion can conduct a flow of electric current. This makes it easy to determine whether the tackifier has been successfully dispersed in water.

The aqueous dispersion can be produced at atmospheric pressure or in a pressurized reactor. The choice of reactor type is within the skilled person's discretion. Generally, when the tackifier has a relatively high softening point, it may be desirable to use a pressurized reactor to allow a high enough mixing temperature for successful phase inversion. Typically, the temperature needed for phase inversion will be at least 10° C. above, preferably about 20° C. above, the softening point of the tackifier.

The tackifier may include other components in addition to the water insoluble, water-dispersible adducted rosin ester. Suitable tackifier components are known in the art, and many are commercially available. For example, the tackifier may further comprise polyterpenes, terpene-phenol resins, aromatic-terpene resins, aromatic-terpene-phenol resins, rosin esters, hydrocarbon resins, liquid hydrocarbon resins, aromatic resins, and mixtures thereof. Examples include Sylvares® terpene phenols such as Sylvares® TP 95, Sylvares® TP 96, Sylvares® TP 105, and Sylvares® TP 115. Suitable polyterpenes include, for example, Sylvares® TR series polyterpenes such as Sylvares® TR 90, Sylvares® TR 105, and Sylvares® TR 125. Suitable hydrocarbon resins include, for example, Sylvares® SA series aromatic resins such as Sylvares® SA 100, Sylvares® SA 120, and Sylvares® SA 140 and α-methylstyrene phenolic resins, for example, Sylvares® 520, Sylvares® 525, and Sylvares® 540. All of the Sylvares® products noted above are products of Arizona Chemical. Suitable tackifier components also include dimerized rosin acids such as Dymerex™ polymerized rosins (products of Eastman Chemical). For additional examples of suitable tackifiers, see U.S. Pat. Nos. 6,900,274 and 7,452,941, the teachings of which are incorporated herein by reference.

Not all tackifiers will be suitable for use. The choice of tackifier components will depend on many factors, and particularly on how easily the components can be dispersed in water. Other factors include the tackifier properties (softening point, equivalent weight, acid number), availability, cost, performance requirements, customer preferences, and the like.

In one embodiment, the tackifier comprises 10 to 50 wt. % of a terpene-phenol resin and 50 to 90 wt. % of the water insoluble, water-dispersible adducted rosin ester. In another embodiment, tackifiers comprise 20 to 40 wt. % of a terpene-phenol resin and 60 to 80 wt. % of the adducted rosin ester.

The tackifier preferably has a softening point within the range of 70° C. to 90° C., more preferably from 75° C. to 85° C., and most preferably about 80° C. This goal is conveniently achieved by combining the water insoluble, water-dispersible adducted rosin ester and any additional tackifier components in the proportion needed to give the tackifier a softening point in the targeted range.

The tackifier preferably has a viscosity at 20° C. above its softening point within the range of 10,000 to 40,000 cP, or from 15,000 to 30,000 cP, most preferably from 20,000 to 25,000 cP.

Any desired surfactant can be used for making the aqueous tackifier dispersions. In one embodiment, the surfactant comprises an anionic surfactant, a nonionic surfactant having an HLB value >10, or a mixture thereof.

The amount of surfactant used will depend on the nature of the surfactant(s) and tackifier components, the tackifier concentration, and other factors. Generally, it is used in an amount of 1 to 10 wt. % of the surfactant, or from 3 to 8 wt. %, or from 5 to 7 wt. %, based on the combined amounts of tackifier components.

In one embodiment, the surfactant comprises a sulfate or phosphate of an ethoxylated fatty alcohol or an ethoxylated fatty acid. In another embodiment, the sulfate or phosphate has a linear or branched $C_8$-$C_{18}$ alkyl chain, or a $C_{12}$-$C_{16}$ alkyl chain. Generally, the sulfate or phosphate has 1 to 60, or 3 to 9, oxyethylene units. In another embodiment, the sulfate or phosphate has a counterion selected from sodium, potassium, ammonium, and calcium. Examples of suitable anionic surfactants are the J-Phos™ and J-Sulf™ ether phosphates or ether sulfates available from J1 Technologies, e.g., J-Phos™ 1066, J-Phos™ 4012, J-Surf™ 3257, and the like. Specialty emulsifiers available from J1 Technologies are also suitable, such as J-Mulse™ 3150, J-Mulse™ 4020, J-Mulse™ 4012, and the like.

Nonionic surfactants having an HLB value >10 (i.e., nonionic surfactants that are relatively hydrophilic), can also be used. Examples include polyoxyethylene (10) cetyl ether, polyoxyethylene (12) nonylphenol ether, polyoxyethylene (20) oleyl ether, polyoxyethylene (100) stearyl ether, Pluronic® EO-capped PPG copolymers (products of BASF), and the like.

In one embodiment, the surfactant is blend of an anionic and nonionic surfactant in which the anionic surfactant is the major component. In another embodiment surfactants comprise at least a 2:1, preferably at least a 3:1 weight ratio of anionic to nonionic surfactant. In a further embodiment, anionic surfactant in the blend is an ethoxylated fatty alcohol phosphate or an ethoxylated fatty acid phosphate.

In another embodiment, the pH of the aqueous dispersion is controlled within the range of 6.0 to 9.0, or from 7.0 to 8.5. Usually, a base such as KOH or ammonium hydroxide is added to the aqueous dispersion to provide the desirable degree of neutralization. In a further embodiment, aqueous ammonium hydroxide is used for neutralization.

The aqueous dispersion preferably has particles with an average diameter less than 1 μm, or less than 500 nm, as measured by dynamic light scattering or other suitable techniques.

The invention includes a pressure-sensitive adhesive. The adhesive comprises a polymer emulsion and an aqueous dispersion of water-dispersible adducted rosin ester prepared as described herein. In one embodiment, the adhesive comprises 1 to 40 wt. %, or 15 to 30 wt. %, of the aqueous dispersion. Suitable emulsions include acrylic polymers, natural rubbers, styrene-butadiene polymers, and the like. In one embodiment, acrylic polymers are used. Suitable acrylic polymers include polymers of alkyl acrylates and methacrylates, especially methyl acrylate, methyl methacrylate, ethyl acrylate, butyl acrylate, butyl methacrylate, 2-ethylhexyl acrylate, isooctyl acrylate, acrylic acid, methacrylic acid, hydroxyethyl acrylate, t-butyl acrylate, and the like. In another embodiment, acrylic polymers are based on butyl acrylate, 2-ethylhexyl acrylate, or mixtures thereof.

Acrylic polymers suitable for use are commercially available. Examples include, among many others, Acronal® acrylic resins from BASF, Synthebond™ acrylic polymers from Momentive Specialty Chemicals, Robond™ adhesives and Primal™ polymer emulsions from Dow Chemical, Novacryl™ polymers from Omnova, Flexcryl™ adhesives from Ashland, and Gelva® GME series adhesives from Cytec.

In one embodiment, the tackifier has a viscosity at room temperature within the range of 300 to 2,000 cP, or from 400 to 1,900 cP, or from 500 to 1,800 cP.

The adhesives are well-suited for the production of labels. The labels can be durable or paper. They can be used for food, general purpose, home, beauty, or other applications. The labels can be removable, semi-permanent, or permanent.

Labels are conveniently produced from laminates. Thus, in one aspect, the invention relates to laminates comprising a release liner, a layer of inventive adhesive coated on a surface of the release liner, and a face stock, such as a paper face stock, that is laminated to the adhesive-coated release liner. After the face stock has been laminated to the release liner, labels are produced from the laminate, normally by punching a plurality of labels of desired dimensions from the laminate.

The invention includes a method of making labels. The method comprises: (a) coating a release liner with an inventive adhesive as described above; (b) applying a face stock to the adhesive-coated release liner to produce a laminate; and (c) producing one or more labels from the laminate. In one embodiment, the labels are produced from a paper face stock, and in another embodiment the labels are punched from the laminate.

In one embodiment paper labels are 80 to 100-g coated paper having a dry coat weight within the range of 15 to 20 $g/m^2$, or from 15 to 18 $g/m^2$, or from 15 to 16 $g/m^2$. In another embodiment, the paper labels of the invention will have a static sheer of at least 2 hours, or of at least 3 hours.

In another embodiment, the paper labels will have a loop tack off LDPE within the range of 1.5 to 3.0 psi, or from 2.0 to 3.0 psi. In a further embodiment, the paper labels will have a loop tack off glass within the range of 3.0 to 6.0 psi, or from 4.0 to 6.0 psi. In an even further embodiment, the paper labels will have a loop tack off corrugated cardboard within the range of 1.5 to 3.0 psi, or from 2.0 to 3.0 psi. Loop tack is measured using PSTC-16, a test method published by the Pressure Sensitive Tape Council (15$^{th}$ edition, 2007). A typical test is described in the examples below.

In one embodiment, the paper labels will have a 90 degree peel off LDPE within the range of 1.0 to 3.0 psi, or from 2.0 to 3.0 psi. In a further embodiment, the paper labels will have a 90 degree peel off corrugated cardboard within the range of 1.0 to 3.0 psi, or from 2.0 to 3.0 psi. The 90 degree peel is performed according to PSTC-14, a test method published by the Pressure Sensitive Tape Council.

The following examples merely illustrate the invention; the skilled person will recognize many variations that are within the spirit of the invention and scope of the claims.

Preparation of Rosin Ester Tackifier A

Tall oil rosin (1349 g) is charged to a 3-L round-bottom flask equipped with nitrogen inlet, mechanical stirrer, Dean-Stark condenser, receiver, thermocouple probe, and temperature controller. The rosin is heated to 190° C. under nitrogen. When the rosin is molten, the agitator is started to ensure uniformity. Pentaerythritol (90 g) and glycerol (90 g) are then added and the mixture is heated to 265° C. for 2 h to give a product having an acid number of ~50 mg KOH/g. Itaconic acid (135 g) is added, and the mixture is heated at 220° C. for 1 h to give an adducted product having an acid number of ~68 mg KOH/g. Polyethylene glycol (Mn about 200, "PEG 200," 135 g) is then added, and the reaction mixture is held at 220° C. until the acid number is ~50 mg KOH/g, and the product has a Mettler softening point of ~70° C. Softening point is determined using a Mettler Toledo FP 90 processor. Molecular weight data is generated using a Perkin Elmer Series 200 SP gel permeation chromatograph. Glass transition temperature data is generated using a TA Instruments, Inc. Model Q2000 differential scanning calorimeter. See Table 1 for finished rosin ester properties.

Preparation of Rosin Ester Tackifiers BG

Rosin ester tackifiers BG are prepared similarly using the reactants indicated in Table 1. For tackifiers F and G, an acid number of 45-55 mg KOH/g is targeted prior to addition of the itaconic acid. Properties for the finished rosin ester tackifiers appear in Table 1.

Solubility of Rosin Ester Tackifiers

The solubility of tackifier A is determined by adding 1.0 gram of tackifier A to a 250 mL beaker on a hot plate. 100 grams of water and a stir bar are added to the beaker and stirred until the water starts to boil. The water is boiled for 10 minutes while stirring. Note: The tackifier clumped floated on the surface of the water. The tackifier is removed and dried in an oven at 120 degrees C. for minutes. The dried tackifier is then weighed on a scale to yield 0.998 grams of tackifier A. Thus, it is concluded that tackifier A is not soluble in water.

The solubility of a XR9003 tackifier (a high molecular weight PEG rosin ester available from Arizona Chemical) is determined by adding 1.0 gram of tackifier A to a 250 mL beaker on a hot plate. 100 grams of water and a stir bar are added to the beaker and stirred until the water starts to boil. The water is boiled for 10 minutes while stirring. Note: The solution was uniform and transparent and there is no visible tackifier in the flask. Thus, it is concluded that XR9003 tackifier is soluble in water.

Aqueous Dispersion Preparation from Tackifier A and Sylvares® TP 105: Atmospheric Reactor Preparation A resin blend is prepared by combining 75 wt. % of finished rosin ester A and 25 wt. % of Sylvares® TP 105 (terpene-phenol resin) and dispersing the mixture in water using the following procedure: A jacketed 1-L glass reactor equipped with thermocouple, liquid addition port, condenser, and high-shear, Greaves-style agitator is pre-heated to 96° C. and then charged with molten resin (250 g). Agitation (250 rpm) is started, and the reactor contents are heated to 99° C. The dispersion temperature for a particular blend is determined based on the temperature at which the neat resin blend's viscosity is near 20,000 cP (typically 20° C. above the blend's softening point).

When the temperature reaches 99° C., agitation is increased to 400 rpm. A surfactant mixture (54.5 g of 27.5 wt. % solution) comprising J-Mulse™ 4012 emulsifier (a product of J1 Technologies, ~1:1 anionic/nonionic surfactant ratio) and tridecyl ether phosphate (to give a 3:1 anionic/nonionic ratio) is added to the resin mixture followed by enough water to cause phase inversion (32.8 g). Upon reaching the inversion point, the resin/surfactant mixture turns white and forms a viscous gel. At or around the phase inversion point, the reactor charge is held for 20 min, and the temperature is maintained to ensure good mixing of the resin/surfactant mixture. More water (154 g) is then added while keeping the mixture at 99° C. and the agitation rate at about 400 rpm. When water addition is complete, the reactor is gradually cooled to near room temperature, and the dispersion (491.3 g) is discharged.

Particle size (Delsa Nano light scattering particle size analyzer): 366 nm; Brookfield viscosity (spindle #3 @ 20 rpm): 750 cP; pH=6.3; total solids: 53.9%.

Paper Label Sample Preparation and PSA Testing

The aqueous dispersion described above is compounded with an acrylic adhesive base polymer at 30% concentration. The compounded adhesive blend is coated on release liner at 16.0 to 16.6 g/m$^2$ dry adhesive coat weight using an Elcometer Applicator (model 4340). The drawdowns are immediately dried in an oven at 102° C. for 2 min. and kept for additional 30 min. under ambient conditions. Drawdowns are laminated to paper face stock and placed in a constant temperature/humidity room (75+/−2° F., 50+/−5% relative humidity) for overnight conditioning.

Loop tack and 90 degree peel adhesion tests on low density polyethylene (LDPE), glass, and recycled corrugated cardboard are performed using a tensile strength tester machine. The LDPE and glass test panels are cleaned with isopropyl alcohol before testing. Laminate sample strips (1"×6") are conditioned overnight in the constant temperature/humidity room. Sample strips used for 90° peel tests are laminated to test panels using a roll down machine followed by a 30-min dwell time and tested side-by-side with a commercial adhesive used for general-purpose paper label applications, which is applied at 20 g/m$^2$ coat weight.

Aqueous Dispersion Preparation in PARR Reactor: General Procedure

The reactor is charged with predetermined amounts of molten resin. After closing the reactor, agitation is started at 350 rpm. The reactor contents are heated to the desired temperature, which varies from batch to batch. The dispersion temperature for a particular blend is determined based on the temperature at which the neat resin blend's viscosity is near 20,000 cP (typically 20° C. above the blend softening point). When $T_{20,000\ cP}$ is reached, the reactor charge is neutralized with 45% KOH solution. After 10 minutes, surfactant solution is added and the agitation is increased to 400 rpm. The KOH and surfactant solutions are added using a high-pressure liquid pump. The inversion point is indicated by a sudden increase in torque and conductivity. At this point, the reactor contents are held for 20 minutes and the temperature is maintained. After the hold time, hot water addition is started. Upon completing the water addition, the reactor charge is cooled to near room temperature. The pressure is typically at or below 30 psi. The aqueous dispersions shown in Table 8 utilize this procedure.

As noted earlier, Table 1 summarizes synthetic formulations and physical properties for inventive water-dispersible adducted rosin esters A-G.

Table 2 shows the effect of formulating adducted rosin ester tackifiers AD with Acronal® V 215 acrylic emulsion at 30 wt. % tackifier. Compared with the control, which is also used at 16 g/m$^2$ coat weight, the inventive compositions provide generally improved adhesive properties (loop tack and 90 degree peel results), particularly the improved loop tack on glass.

TABLE 1

Synthesis and Properties of Adducted Rosin Esters

| | Resin | | | | | | |
|---|---|---|---|---|---|---|---|
| | A | B | C | D | E | F* | G* |
| Wt. % | | | | | | | |
| Rosin acid, R Type S (90/10) | 74.94 | 74.94 | 76.44 | 76.44 | 84.00 | 74.94 | 74.94 |
| Itaconic acid | 7.50 | 7.50 | 6.00 | 6.00 | 0 | 7.50 | 7.50 |
| Fumaric acid | 0 | 0 | 0 | 0 | 3.00 | 0 | 0 |
| Pentaerythritol | 5.00 | 5.00 | 8.00 | 2.00 | 5.00 | 5.00 | 5.00 |

TABLE 1-continued

Synthesis and Properties of Adducted Rosin Esters

| | Resin | | | | | | |
|---|---|---|---|---|---|---|---|
| | A | B | C | D | E | F* | G* |
| Glycerol | 5.00 | 5.00 | 2.00 | 8.00 | 5.00 | 5.00 | 5.00 |
| PEG 400 | — | 7.50 | 7.50 | — | — | — | 7.50 |
| PEG 200 | 7.50 | — | — | 7.50 | 3.00 | 7.50 | — |
| Anox ® 20/Irganox ® 1010/E310[1] | 0.06 | 0.06 | 0.06 | 0.06 | 0.06 | 0.06 | 0.06 |
| total | 100.0 | 100.0 | 100.0 | 100.0 | 100.0 | 100.0 | 100.0 |
| Specifications | | | | | | | |
| Acid number, mg KOH/g | 41.5 | 44.2 | 47.7 | 46.9 | 34.9 | 47.3 | 53.3 |
| Gardner color, neat | 8.0 | 8.0 | 9+ | 8 | 8− | 8+ | 7+ |
| Mettler softening point, ° C. | 67.8 | 68.4 | 69.9 | 62.6 | 88.2 | 71.5 | 72 |
| Brookfield viscosity, cP @ 90° C. | 24000 | 35350 | 45200 | 13225 | — | — | — |
| @ 95° C. | 12925 | 18650 | 24900 | 7338 | — | 14200 | 17900 |
| @ 100° C. | 7263 | 10525 | 12625 | 4350 | 29125 | 9475 | 10800 |
| Mn | 572 | 614 | 598 | 530 | 692 | 595 | 606 |
| Mw | 1080 | 1271 | 1109 | 893 | 1549 | 1019 | 1126 |
| Mz | 2780 | 3524 | 2318 | 2019 | 3812 | 2110 | 2647 |
| Mz + 1 | 7246 | 7498 | 4878 | 5642 | 6490 | 4046 | 5198 |
| polydispersity (Mw/Mn) | 1.89 | 2.07 | 1.86 | 1.69 | 2.24 | 1.71 | 1.86 |
| Tg, midpoint, ° C. | 16.7 | 19.0 | 16.0 | 11.3 | 48.8 | 14.4 | 15.7 |

*Target acid number 45-55 mg KOH/g before addition of itaconic acid.
[1]Blend of Anox ® 20 (hindered phenolic antioxidant, product of Chemtura), Irganox ® 1010 (hindered phenol antioxidant, product of Ciba Specialty Chemicals), and E310 (propyl gallate).

TABLE 2

Adhesives from Adducted Rosin Esters and an Acrylic Dispersion

| Formulation: | Control* | | | | |
|---|---|---|---|---|---|
| adducted RE tackifier | | A | B | C | D |
| tackifier dispersion, % solids | | 55.30 | 53.61 | 54.40 | 53.57 |
| tackifier dispersion, g | 17.44 | 17.85 | 17.66 | 17.86 | |
| Acronal ® V 215, g | 33.02 | 32.76 | 32.88 | 32.75 | |
| tackifier/polymer (dry:dry) | 30:70 | 30:70 | 30:70 | 30:70 | |
| base | NH4OH | NH4OH | NH4OH | NH4OH | |
| coat wt. (g/m$^2$) | 16.1 | 16.2 | 16.1 | 16.0 | 16.3 |
| Adhesive properties: | | | | | |
| loop tack, LDPE, lbs. | 2.3 | 2.0 | 2.3 | 2.1 | 2.2 |
| loop tack, glass, lbs. | 2.8 | 3.6 | 3.9 | 4.0 | 3.6 |
| loop tack, cor. cardboard, lbs. | 1.5 | 1.3 | 1.5 | 1.5 | 1.7 |
| 90° peel, LDPE, pli | 1.1 | 1.1 | 1.3 | 1.4 | 1.4 |
| 90° peel, cor. cardboard, pli | 1.0 | 1.2 | 1.2 | 1.0 | 1.1 |
| Conclusion: | Generally improved results at same coat weight, particularly loop tack on glass. | | | | |

*Control = commercial label adhesive.
Acronal ® V 215 acrylate copolymer dispersion is a product of BASF.
Loop tack and 90° peel results are an average of three samples.

In the Table 3 experiments, adducted rosin ester tackifiers BD are used with a 50:50 blend of acrylic polymers used for pressure-sensitive adhesives. Here, the control is formulated at 18 g/m$^2$, and the experimental samples are formulated at 16 g/m$^2$. Except for static shear, the adducted rosin ester tackifier provides generally equal performance at the lower coat weight.

TABLE 3

Adhesives from Adducted Rosin Esters and an Acrylic Dispersion

| Formulation: | Control* | | | |
|---|---|---|---|---|
| adducted RE tackifier | | B | C | D |
| tackifier dispersion, % solids | | 53.61 | 54.40 | 53.57 |
| tackifier dispersion, g | | 14.0 | 13.8 | 14.0 |
| acrylic polymer dispersion 1, g | | 13.2 | 13.25 | 13.2 |
| acrylic polymer dispersion 2, g | | 13.2 | 13.25 | 13.2 |
| tackifier/polymer (dry:dry) | | 30:70 | 30:70 | 30:70 |
| base | | NH4OH | NH4OH | NH4OH |
| coat wt. (g/m$^2$) | 18.0 | 16.2 | 16.2 | 16.2 |
| Adhesive properties: | | | | |
| static shear, h | 7.3 | 4.0 | 3.3 | 2.6 |
| loop tack, LDPE, lbs. | 2.1 | 2.2 | 1.9 | 2.0 |
| loop tack, glass, lbs. | 4.0 | 4.2 | 3.8 | 3.8 |
| loop tack, cor. cardboard, lbs. | 1.1 | 1.1 | 1.0 | 1.1 |
| 90° peel, LDPE, pli | 1.2 | 1.3 | 1.2 | 1.2 |
| 90° peel, cor. cardboard, pli | 1.4 | 1.5 | 1.4 | 1.3 |
| Conclusion: | Except for static shear, generally equal performance from the adducted RE tackifiers versus control at lower coat weight. | | | |

*Control = commercial label adhesive.
Loop tack and 90° peel results are an average of three samples.
Static shear: stainless steel, 1" × 1" × 1000 g, average of three samples.

Table 4 summarizes examples in which the water-dispersible adducted rosin ester (A or B) is not the only tackifier component. Commercially available terpene-phenol resins (Sylvares® TP 95 and TP 105) and a dimerized rosin (Dymerex™ rosin) are included at 5 to 25 wt. % based on the combined amounts of adducted rosin ester and commercial tackifier. Thus, the first entry in Table 4 illustrates a tackifier mixture of 25 wt. % Sylvares® TP 95 and 75 wt. % of adducted rosin ester A. A portion (about 18 g) of the resulting aqueous tackifier dispersion (53% solids) is combined with Acronal® V 215 acrylic emulsion (32.7 g) to give the tackified adhesive formulation. As shown in the table, the inventive formulations perform as well as or better than the control formulation at a 20% lower coat weight (16 g/m$^2$ versus 20 g/m$^2$).

TABLE 4

Adhesives from Adducted Rosin Esters, Other Tackifiers, and an Acrylic Dispersion

| Formulation: | Control* | | | | | | | | |
|---|---|---|---|---|---|---|---|---|---|
| adducted RE tackifier | | A | A | A | A | B | B | B | B |
| % Sylvares ® TP 95 | 25 | — | — | — | — | 25 | — | — | — |
| % Sylvares ® TP 105 | — | 25 | — | — | — | — | 25 | — | — |
| % Dymerex ™ rosin | — | — | — | 15 | 5 | — | — | 15 | 5 |
| tackifier dispersion, % solids | | 53.14 | 54.24 | 54.13 | 53.73 | 58.75 | 56.33 | 53.62 | 53.10 |
| tackifier dispersion, g | | 17.97 | 17.69 | 17.72 | 17.82 | 16.68 | 17.21 | 17.85 | 17.98 |
| Acronal ® V 215, g | | 32.69 | 32.86 | 32.84 | 32.78 | 33.55 | 33.18 | 32.76 | 32.68 |
| tackifier/polymer (dry:dry) | | 30:70 | 30:70 | 30:70 | 30:70 | 30:70 | 30:70 | 30:70 | 30:70 |
| base | | $NH_4OH$ | $NH_4OH$ | $NH_4OH$ | $NH_4OH$ | $NH_4OH$ | $NH_4OH$ | $NH_4OH$ | $NH_4OH$ |
| coat wt. (g/m$^2$) | 19.8 | 16.3 | 16.4 | 16.4 | 16.3 | 16.3 | 16.2 | 16.3 | 16.3 |
| Adhesive properties: | | | | | | | | | |
| static shear, h | 8.6 | 15 | 12 | 18 | 13 | 8.3 | 9.9 | 16 | 12 |
| loop tack, LDPE, lbs. | 2.5 | 2.1 | 2.4 | 2.3 | 2.1 | 2.1 | 2.0 | 1.7 | 2.0 |
| loop tack, glass, lbs. | 3.4 | 3.7 | 4.2 | 4.0 | 3.7 | 3.6 | 3.5 | 3.6 | 3.7 |
| loop tack, cor. cardboard, lbs. | 1.8 | 1.6 | 1.9 | 1.5 | 1.1 | 1.6 | 1.6 | 1.3 | 1.3 |
| 90° peel, LDPE, pli | 1.3 | 1.4 | 1.4 | 1.4 | 1.4 | 1.3 | 1.3 | 1.3 | 1.4 |
| 90° peel, cor. cardboard, pli | 1.2 | 1.3 | 1.1 | 1.2 | 1.0 | 1.2 | 1.1 | 1.2 | 1.2 |
| Conclusion: | | Generally equal performance from the adducted RE tackifiers versus control at lower coat weight. | | | | | | | |

*Control = commercial label adhesive.
Acronal ® V 215 dispersion is a product of BASF.
Loop tack and 90° peel results are an average of three samples.
Static shear: stainless steel, 1" × 1" × 1000 g, average of three samples.
Sylvares ® TP 95 and TP 105 are terpene-phenol resins, products of Arizona Chemical.
Dymerex ™ polymerized rosin is a product of Eastman Chemical.

Table 5 demonstrates that inventive water-dispersible adducted rosin esters A and B can be combined with Sylvares® TP 105 at a 3:1 weight ratio to give good adhesives with either the acrylic polymer blend or with Acronal® V 215 dispersion. Note that the adhesive properties from the inventive adducted rosin ester blends rival those from the control even with a 20% reduction in coat weight. The last entry shows that adducted rosin ester C (8:2 pentaerythritol to glycerin ratio) can be used alone to give an adhesive that performs well at low coat weight.

Table 6 summarizes formulations using 75 wt. % of a water-dispersible adducted rosin ester (A, B, F, or G) with 25 wt. % of Sylvares® TP 105 in an Acronal® V 215 system. In each case, the tackifier blend comprising the adducted rosin ester performs as well as or better than the control at a much lower coat weight (16 g/m$^2$ versus 19.5 or 20 g/m$^2$).

Table 7 shows similar results when the same resins are used with 25 wt. % of Sylvares® TP 105 and the acrylic polymer blend.

Table 8 shows the effect of increasing the softening point of the tackifier blend. Water-dispersible adducted rosin esters A or F are combined with 50 wt. % of Sylvares® TP 95, TP 105, or TP 115, which have softening points of 95° C., 105° C., and 115° C., respectively. The aqueous tackifier dispersions are prepared in a pressurized reactor as described earlier. Generally, the adducted rosin ester tackifiers provide equal adhesive performance at a 20% reduction in coat weight. The results suggest better looptack on glass when terpene-phenol resins with higher softening points are used.

The examples in Table 9 show the effect of varying the pH and the ratio of anionic to nonionic surfactant in preparing tackifier dispersions from water-dispersible adducted rosin ester A. Generally, all of the formulations provide improved adhesive performance at reduced coat weight.

Table 10 shows the effect of coat weight on adhesive properties for a series of adhesives made using 75 wt. % of adducted rosin ester A and 25 wt. % of Sylvares TP 105. The inventive tackifiers provide generally equal performance versus the control when used at lower coat weight and higher performance than the control when used at the same coat weight.

TABLE 5

Adhesives from Adducted Rosin Esters, a Terpene-Phenol Tackifier, and an Acrylic Dispersion

| Formulation: | Control* | | | | | |
|---|---|---|---|---|---|---|
| adducted RE tackifier | | A | A | B | B | C |
| % Sylvares ® TP 105 | | 25 | 25 | 25 | 25 | 0 |
| tackifier dispersion, % solids | | 53.95 | 53.95 | 56.50 | 56.50 | 53.89 |
| tackifier dispersion, g | | 13.90 | 13.22 | 13.44 | 13.73 | 13.91 |
| Acronal ® V 215, g | | 0 | 26.25 | 0 | 26.56 | 0 |
| acrylic polymer dispersion 1, g | | 13.22 | 0 | 13.38 | 0 | 13.22 |
| acrylic polymer dispersion 2, g | | 13.22 | 0 | 13.38 | 0 | 13.22 |

TABLE 5-continued

Adhesives from Adducted Rosin Esters, a Terpene-Phenol Tackifier, and an Acrylic Dispersion

|  | Control* | | | | | |
|---|---|---|---|---|---|---|
| tackifier/polymer (dry:dry) |  | 30:70 | 30:70 | 30:70 | 30:70 | 30:70 |
| base |  | NH₄OH | NH₄OH | NH₄OH | NH₄OH | NH₄OH |
| coat wt. (g/m²) | 20.0 | 16.1 | 16.3 | 16.0 | 16.6 | 16.2 |
| Adhesive properties: | | | | | | |
| loop tack, LDPE, lbs. | 2.1 | 1.7 | 2.2 | 1.9 | 1.9 | 2.0 |
| loop tack, glass, lbs. | 3.7 | 3.5 | 3.6 | 3.8 | 3.5 | 3.5 |
| loop tack cor. cardboard, lbs. | 1.9 | 1.8 | 1.8 | 2.1 | 2.0 | 1.5 |
| 90° peel, LDPE, pli | 1.2 | 1.3 | 1.4 | 1.5 | 1.3 | 1.3 |
| 90° peel, cor. cardboard, pli | 1.1 | 0.9 | 1.0 | 1.0 | 1.0 | 1.0 |
| Conclusion: | Generally equal performance from the adducted RE tackifiers versus control at lower coat weight. | | | | | |

*Control = commercial label adhesive,
Acronal ® V 215 dispersion is a product of BASF.
Loop tack and 90° peel results are an average of three samples.
Sylvares ® TP 105 terpene-phenol resin is a product of Arizona Chemical.

TABLE 6

Adhesives from Adducted Rosin Esters, a Terpene-Phenol Tackifier, and an Acrylic Dispersion

| Formulation: | Control* | | | | | Control* | | | | |
|---|---|---|---|---|---|---|---|---|---|---|
| adducted RE tackifier |  | B | B | G | G |  | A | A | A | F |
| % Sylvares ® TP 105 |  | 25 | 25 | 25 | 25 |  | 25 | 25 | 25 | 25 |
| tackifier dispersion, % solids |  | 52.83 | 53.06 | 54.56 | 53.01 |  | 53.44 | 53.63 | 54.02 | 52.91 |
| tackifier dispersion, g |  | 14.45 | 14.40 | 14.11 | 14.41 |  | 14.33 | 14.29 | 14.21 | 14.43 |
| Acronal ® V 215, g |  | 26.10 | 26.13 | 26.32 | 26.13 |  | 26.18 | 26.20 | 26.25 | 26.11 |
| tackifier/polymer (dry:dry) |  | 30:70 | 30:70 | 30:70 | 30:70 |  | 30:70 | 30:70 | 30:70 | 30:70 |
| base |  | NH₄OH | NH₄OH | NH₄OH | NH₄OH |  | NH₄OH | NH₄OH | NH₄OH | NH₄OH |
| coat wt. (g/m²) | 19.5 | 16.3 | 15.9 | 16.2 | 16.0 | 20.2 | 15.9 | 16.3 | 16.5 | 16.0 |
| Adhesive properties: | | | | | | | | | | |
| loop tack, LDPE, lbs. | 1.6 | 1.4 | 1.4 | 1.4 | 1.6 | 2.0 | 1.8 | 1.7 | 1.7 | 1.5 |
| loop tack, glass, lbs. | 3.2 | 3.5 | 3.7 | 3.2 | 3.5 | 4.2 | 3.6 | 3.6 | 3.4 | 3.4 |
| loop tack, cor. cardboard, lbs. | 1.6 | 1.3 | 1.3 | 1.2 | 1.2 | 1.6 | 1.7 | 1.8 | 1.4 | 1.4 |
| 90° peel, LDPE, pli | 1.3 | 1.2 | 1.3 | 1.4 | 1.3 | 1.5 | 1.3 | 1.4 | 1.3 | 1.3 |
| 90° peel, cor. cardboard, pli | 1.1 | 1.2 | 1.1 | 1.2 | 1.3 | 1.2 | 1.1 | 1.0 | 1.0 | 1.1 |
| Conclusion: | Generally equal performance from the adducted RE tackifiers versus control at lower coat weight. | | | | | | | | | |

*Control = commercial label adhesive.
Acronal ® V 215 dispersion is a product of BASF.
Loop tack and 90° peel results are an average of three samples.
Sylvares ® TP 105 terpene-phenol resin is a product of Arizona Chemical.

TABLE 7

Adhesives from Adducted Rosin Esters, a Terpene-Phenol Tackifier, and an Acrylic Dispersion

| Formulation: | Control* | | | | | Control* | | | | |
|---|---|---|---|---|---|---|---|---|---|---|
| adducted RE tackifier |  | B | B | G | G |  | A | A | A | F |
| % Sylvares ® TP 105 |  | 25 | 25 | 25 | 25 |  | 25 | 25 | 25 | 25 |
| tackifier dispersion, % solids |  | 52.83 | 53.06 | 54.56 | 53.01 |  | 53.63 | 54.02 | 54.02 | 53.65 |
| tackifier dispersion, g |  | 13.99 | 13.95 | 13.66 | 13.96 |  | 13.84 | 13.76 | 13.76 | 13.83 |
| acrylic polymer dispersion, g |  | 26.39 | 26.42 | 26.61 | 26.41 |  | 26.49 | 26.54 | 26.54 | 26.50 |
| tackifier/polymer (dry:dry) |  | 30:70 | 30:70 | 30:70 | 30:70 |  | 30:70 | 30:70 | 30:70 | 30:70 |
| base |  | NH₄OH | NH₄OH | NH₄OH | NH₄OH |  | NH₄OH | NH₄OH | NH₄OH | NH₄OH |
| coat wt. (g/m²) | 19.5 | 16.5 | 16.1 | 16.0 | 16.1 | 19.6 | 16.2 | 16.3 | 16.2 | 16.1 |

TABLE 7-continued

Adhesives from Adducted Rosin Esters, a Terpene-Phenol Tackifier, and an Acrylic Dispersion

| | Control* | | | | | Control* | | | | |
|---|---|---|---|---|---|---|---|---|---|---|
| Adhesive properties: | | | | | | | | | | |
| loop tack, LDPE, lbs. | 1.6 | 1.5 | 1.2 | 1.3 | 1.1 | 2.0 | 1.7 | 1.9 | 1.9 | 1.7 |
| loop tack, glass, lbs. | 3.2 | 3.5 | 3.9 | 4.0 | 3.1 | 3.9 | 4.0 | 4.7 | 3.7 | 3.8 |
| loop tack, cor. cardboard, lbs. | 1.6 | 1.2 | 1.3 | 1.1 | 1.4 | 1.7 | 1.3 | 1.6 | 1.4 | 1.8 |
| 90° peel, LDPE, pli | 1.3 | 1.4 | 0.9 | 1.3 | 1.3 | 1.2 | 1.2 | 1.3 | 1.2 | 1.2 |
| 90° peel, cor. cardboard, pli | 1.1 | 1.1 | 1.0 | 1.1 | 1.1 | 1.2 | 0.9 | 0.8 | 1.0 | 1.1 |
| Conclusion: | Generally equal performance from the adducted RE tackifiers versus control at lower coat weight. | | | | | | | | | |

*Control = commercial label adhesive.
Loop tack and 90° peel results are an average of three samples.
Sylvares ® TP 105 terpene-phenol resin is a product of Arizona Chemical.

TABLE 8

Adhesives from Adducted Rosin Esters, a Terpene-Phenol Tackifier, and an Acrylic Dispersion: PARR Reactor Runs

| | Control* | | Control* | | |
|---|---|---|---|---|---|
| Formulation: | | | | | |
| adducted RE tackifier | — | A | — | F | F |
| % Sylvares ® TP 95 | — | 50 | — | — | — |
| % Sylvares ® TP 105 | — | — | — | 50 | — |
| % Sylvares ® TP 115 | — | — | — | — | 50 |
| tackifier dispersion, % solids | — | 53.11 | — | 55.74 | 53.03 |
| tackifier dispersion, g | — | 17.60 | — | 16.99 | 17.62 |
| acrylic polymer dispersion, g | — | 32.91 | — | 33.33 | 32.90 |
| tackifier/polymer (dry:dry) | — | 30:70 | — | 30:70 | 30:70 |
| base | — | KOH | — | KOH | KOH |
| coat wt. (g/m²) | 20.7 | 16.1 | 20.7 | 16.6 | 16.1 |
| Adhesive properties: | | | | | |
| loop tack, LDPE, lbs. | 2.3 | 2.1 | 2.3 | 1.9 | 2.2 |
| loop tack, glass, lbs. | 4.1 | 2.8 | 4.1 | 3.8 | 3.7 |
| loop tack, cor. cardboard, lbs. | 1.7 | 1.8 | 1.9 | 1.4 | 1.5 |
| 90° peel, LDPE, pli | 1.4 | 1.4 | 1.4 | 1.1 | 1.3 |
| 90° peel, cor. cardboard, pli | 1.4 | 1.1 | 1.2 | 1.2 | 1.2 |
| Conclusion: | Generally equal performance from the adducted RE tackifiers versus control at lower coat weight. Better loop tack on glass from terpene-phenol resins with higher softening points. | | | | |

*Control = commercial label adhesive.
Loop tack and 90° peel results are an average of three samples.
Sylvares ® TP 95, TP 105, and TP 115 terpene-phenol resins are products of Arizona Chemical.

TABLE 9

Adhesives from Adducted Rosin Esters and an Acrylic Dispersion: Effect of Surfactant

| | Control* | | | | | |
|---|---|---|---|---|---|---|
| Formulation: | | | | | | |
| adducted RE tackifier | | A | A | A | A | A |
| tackifier dispersion, % solids | | 54.11 | 53.83 | 53.87 | 54.15 | 53.47 |
| tackifier dispersion, g | | 17.29 | 17.36 | 17.35 | 17.40 | 17.30 |
| acrylic polymer dispersion, g | | 33.12 | 33.07 | 33.08 | 33.00 | 33.10 |
| tackifier/polymer (dry:dry) | | 30:70 | 30:70 | 30:70 | 30:70 | 30:70 |
| base | | NH$_4$OH | NH$_4$OH | NH$_4$OH | NH$_4$OH | NH$_4$OH |
| dispersion surfactant system | | 6% (3:1) J-Mulse 4012 mixture | 6% (3:1) J-Mulse 4012 mixture | 5% (3:1) J-Mulse 4012 mixture | 6% (4:1) J-Mulse 4012 mixture | 5% (4:1) J-Mulse 4012 mixture |
| pH | | 7.5 | 8.5 | 8.5 | 8.5 | 8.5 |
| coat wt. (g/m²) | 20.5 | 16.1 | 16.6 | 16.2 | 16.0 | 16.4 |
| Adhesive properties: | | | | | | |
| loop tack, LDPE, lbs. | 2.1 | 1.9 | 2.0 | 1.8 | 2.0 | 1.9 |
| loop tack, glass, lbs. | 4.8 | 5.7 | 5.1 | 4.3 | 4.7 | 4.2 |
| loop tack, cor. cardboard, lbs. | 2.1 | 1.9 | 2.0 | 2.1 | 2.0 | 1.8 |
| 90° peel, LDPE, pli | 1.3 | 1.4 | 1.5 | 1.6 | 1.4 | 1.3 |
| 90° peel, glass, pli | 2.7 | 3.0 | 2.7 | 2.4 | 2.0 | 2.5 |
| 90° peel, cor. cardboard, pli | 1.3 | 1.1 | 1.2 | 1.2 | 1.2 | 1.1 |
| Conclusion: | Generally equal performance from the adducted RE tackifiers versus control at lower coat weight. | | | | | |

*Control = commercial label adhesive.
Loop tack and 90° peel results are an average of three samples.
J-Mulse ™ 4012 emulsifier is a product of J1 Technologies having ~1:1 anionic/nonionic surfactant ratio;
additional anionic surfactant (tridecyl ether phosphate) is added to give the 3:1 or 4:1 ratios recited above.

TABLE 10

Adhesives from Adducted Rosin Esters, a Terpene-Phenol Tackifier, and an Acrylic Dispersion: "Coat Ladder"

|  | Control* | | | | |
|---|---|---|---|---|---|
| Formulation: | | | | | |
| adducted RE tackifier |  | A | A | A | A |
| % Sylvares ® TP 105 |  | 25 | 25 | 25 | 25 |
| tackifier dispersion, % solids |  | 59.39 | 59.39 | 59.39 | 59.39 |
| tackifier dispersion, g |  | 113.28 | 16.14 | 16.14 | 16.14 |
| acrylic polymer dispersion, g |  | 237.56 | 33.86 | 33.86 | 33.86 |
| tackifier/polymer (dry:dry) |  | 30:70 | 30:70 | 30:70 | 30:70 |
| pH |  | 7.0 | 8.6 | 8.6 | 8.6 |
| coat wt. (g/m$^2$) | 19.8 | 16.2 | 16.2 | 17.5 | 19.5 |
| Adhesive properties: | | | | | |
| static shear, h | 13 | 8.0 | 7.0 | 5.3 | 4.3 |
| loop tack, LDPE, lbs. | 2.0 | 1.9 | 2.1 | 2.2 | 1.9 |
| loop tack, glass, lbs. | 6.2 | 6.1 | 5.8 | 6.1 | 6.5 |
| loop tack, cor. cardboard, lbs. | 2.2 | 2.0 | 1.8 | 2.2 | 2.2 |
| 90° peel, LDPE, pli | 1.4 | 1.5 | 1.5 | 1.3 | 1.7 |
| 90° peel, cor. cardboard, pli | 1.1 | 1.3 | 1.2 | 1.4 | 1.9 |
| Conclusion: | Generally equal performance from the adducted RE tackifiers versus control when used at lower coat weight, and higher performance than control when used at the same coat weight. | | | | |

*Control = commercial label adhesive.
Loop tack and 90° peel results are an average of three samples.
Sylvares ® TP 105, terpene-phenol resin, is a product of Arizona Chemical.

The preceding examples are meant only as illustrations; the following claims define the scope of the invention.

We claim:

1. A rosin ester dispersion composition comprising:
   (a) an adducted rosin ester produced by:
      reacting a rosin with a polyol to provide a rosin ester intermediate; and
      reacting the rosin ester intermediate with a dienophile to provide an adducted rosin ester; and
   (b) water;
   wherein said adducted rosin ester is esterified with a polyethylene glycol having a weight-average molecular weight less than 700.

2. The rosin ester dispersion composition of claim 1 wherein the polyethylene glycol has a weight-average molecular weight within the range of 200 to 400.

3. The rosin ester dispersion composition of claim 1 wherein the adducted rosin ester has an acid value within the range of 45 to 55 mg KOH/g.

4. The rosin ester dispersion composition of claim 1 wherein the adducted rosin ester has a ring-and-ball softening point within the range of 65 to 72° C.

5. The rosin ester dispersion composition of claim 1 wherein the adducted rosin ester comprises at least 5 wt. % of adducted itaconic acid.

6. The rosin ester dispersion composition of claim 1 further comprising a surfactant and a tackifier.

7. The rosin ester dispersion composition of claim 6 comprising 35 to 60 wt. % of water, 0.1 to 10 wt. % of the surfactant, and 40 to 65 wt. % of the tackifier.

8. The rosin ester dispersion composition of claim 6 wherein the tackifier further comprises a resin selected from the group consisting of polyterpenes, terpene-phenol resins, aromatic-terpene resins, aromatic-terpene-phenol resins, rosin esters, hydrocarbon resins, liquid hydrocarbon resins, aromatic resins, and mixtures thereof.

9. The rosin ester dispersion composition of claim 6 wherein the surfactant comprises a sulfate or phosphate of an ethoxylated fatty alcohol or an ethoxylated fatty acid.

10. The rosin ester dispersion composition of claim 1 further comprising a polymer emulsion.

11. The rosin ester dispersion composition of claim 10 wherein the polymer emulsion is selected from the group consisting of acrylic polymers, natural rubbers, and styrene-butadiene polymers.

12. The rosin ester dispersion composition of claim 1, wherein the adducted rosin ester esterified with the polyethylene glycol is insoluble in water.

13. The rosin ester dispersion composition of claim 1, wherein the polyol is selected from the group consisting of glycerin, pentaerythritol, trimethylolpropane, trimethylolethane, ethylene glycol, propylene glycol, diethylene glycol, triethylene glycol, tetraethylene glycol, dipentaerythritol, and sorbitol 1,3-propanediol, 2-methyl-1,3-propanediol, 1,4-butanediol, 1,6-hexanediol, 1,4-cyclohexanedimethanol, diglycerol, dipentaerythritol, mannitol, sorbitol, hexitol, and mixtures thereof.

* * * * *